H. COMSTOCK.

ATTACHMENT FOR PIPE CUTTERS.

No. 11,243. Reissued June 7, 1892.

Witnesses.
Robt Coutt.
J. A. Rutherford.

Inventor.
Harry Comstock.
By James L. Norris.
Atty.

THE NORRIS PETERS CO., PHOTO-LITHO., WASHINGTON, D. C.

UNITED STATES PATENT OFFICE.

HARRY COMSTOCK, OF FULTON, NEW YORK.

ATTACHMENT FOR PIPE-CUTTERS.

SPECIFICATION forming part of Reissued Letters Patent No. 11,243, dated June 7, 1892.

Original No. 440,017, dated November 4, 1890. Application for reissue filed March 2, 1892. Serial No. 423,541.

*To all whom it may concern:*

Be it known that I, HARRY COMSTOCK, a citizen of the United States, residing at Fulton, in the county of Oswego and State of New York, have invented new and useful Improvements in Attachments for Pipe-Cutters, of which the following is a specification.

It is the purpose of my invention to provide a new and improved burr-removing attachment for an ordinary pipe-cutter, which is capable of accommodating various sizes of pipe, and to provide a novel construction whereby a guiding-rib shall be prevented from passing beyond a limit imposed by parallel plain surfaces arranged at the sides of the serrated faces by which the burr is removed.

It is also my purpose to provide the attachment with grooves or channels at the sides of the serrated burr-removing portions, which are adapted to receive oil, and to form receptacles for the particles or chips removed from the pipe by the burr-reducing portions, and to provide parallel supporting-strips which shall arrest the pipe at the point where the guiding-ribs of the attachment have fully entered the incision made by the ordinary pipe-cutter.

My invention consists to these ends in the several novel features of construction and new combinations of parts hereinafter fully set forth, and then specifically pointed out in the claims following this specification.

To enable others skilled in the art to practice my invention, I will describe the same in detail, reference being had to the accompanying drawings, in which—

Figure 1:
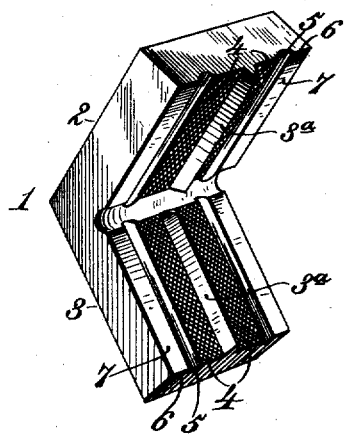
Figure 2:
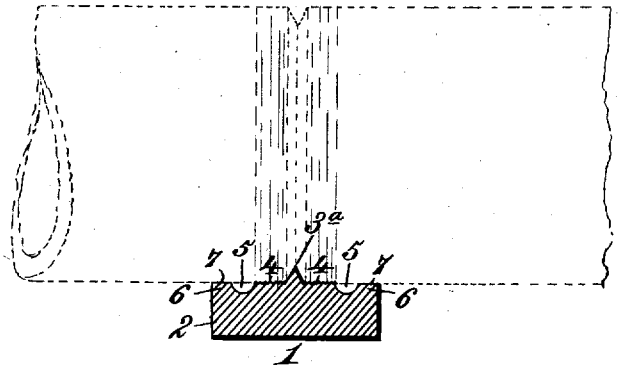

Figure 1 is a perspective view of an attachment embodying my invention, and Fig. 2 is a transverse sectional view of the same.

I show and describe in this application the attachment only, the ordinary pipe-cutter being omitted, since its construction is well known and requires no special explanation.

In the drawings the reference-numeral 1 denotes a plate formed of a single piece of metal having angular shape, the two similar parts 2 and 3 being arranged relatively to each other at an angle of somewhat less than forty-five degrees. This angular plate may be arranged and supported in the frame or head of a pipe-cutter by any of the ordinary well-known constructions.

Upon the two converging or angular faces of the plate are formed the guiding-ribs $3^a$, of hardened steel, arranged in a substantially central line and substantially coextensive with the length of the inner converging faces of the plate. Upon each side of these ribs is a serrated or roughened face or surface 4, which is adapted to act upon the burr produced by the action of the pipe-cutters upon the pipe, and upon the outer margins of these serrated or file-cut surfaces are formed grooves or channels 5, running parallel with the serrated or roughened surfaces 4. Upon the converging faces of the plate are also formed marginal ribs, strips, or surfaces 6, having smooth faces 7, which are substantially in the same plane with the serrated or roughened faces 4, by which the burr is removed from the pipe. When the pipe-cutter provided with my attachment is applied to a pipe and turned as usual, the guiding-ribs enter the incision made by the pipe-cutter far enough to bring the exterior surface of the pipe into contact with the serrated or abraded surfaces 4, when the exterior face of the pipe will make engagement with and rest upon the smooth faces 7 of the lateral or marginal raised portions 6, thereby preventing the guiding-ribs from making farther penetration and at the same time arresting the action of the serrated faces 4 upon the burr and upon the outer face of the pipe. The limitation of action in these respects will take place at the instant the burr and scale are both fully removed from the ends of the pipe. If desired, oil may be poured into the grooves or channels 5, whereby the friction upon the pipe will be decreased about one-half, and these channels will serve also to receive the particles, chips, or waste metal dressed off by the burr-removing portions of the attachment.

Heretofore and prior to my invention it has been customary to abrade the entire surface of the attachment on each side of the guiding-ribs $3^a$, whereby a friction greatly in excess of that required is produced. Moreover, as the burr was dressed off the file-teeth would take into the surface of the pipe and wear the latter away, thereby allowing the guiding-ribs to sink deeper, and unless a close watch was kept the accuracy of the work would be seriously endangered.

By the marginal smooth-faced ribs 6 I arrest the action of the abrading-faces at the same point in all cases and in pipes of all sizes, giving a perfectly-uniform outer surface upon both extremities of the pipe.

What I claim is—

1. The angular attachment for a pipe-cutter herein described, having converging faces provided with abrading-surfaces and marginal ribs or strips with smooth surfaces arranged in or nearly in the plane of the abrading-surfaces, substantially as described.

2. An angular attachment for a pipe-cutter, having its converging faces provided with guiding-ribs and with abrading-surfaces upon each side of said ribs, said attachment also having marginal ribs or strips, their smooth faces being arranged in or nearly in the plane of the abrading-surfaces, substantially as described.

3. An angular attachment for a pipe-cutter, having guiding-ribs upon its converging faces and provided upon each side of said ribs with abrading-surfaces and with smooth-surfaced marginal ribs or strips separated from the abrading-surfaces by channels parallel with the ribs, the smooth surfaces of the marginal ribs being substantially in the plane of the abrading-surfaces, substantially as described.

4. An attachment for a pipe-cutter, formed of a single piece of metal having angular form, its similar parts being provided with central guiding-ribs $3^a$, abrading or serrated faces 4, grooves or channels 5, and marginal ribs or strips 6, having smooth faces which lie in or nearly in the plane of the abrading-surfaces 4, substantially as described.

In testimony whereof I have hereunto signed my name in the presence of two subscribing witnesses.

HARRY COMSTOCK.

Witnesses:
AMOS YOUMANS,
LANGDON C. FOSTER.